W. RUDD & J. C. WILLIAMS.
NUT LOCK.
APPLICATION FILED DEC. 30, 1912.
1,095,928.
Patented May 5, 1914.
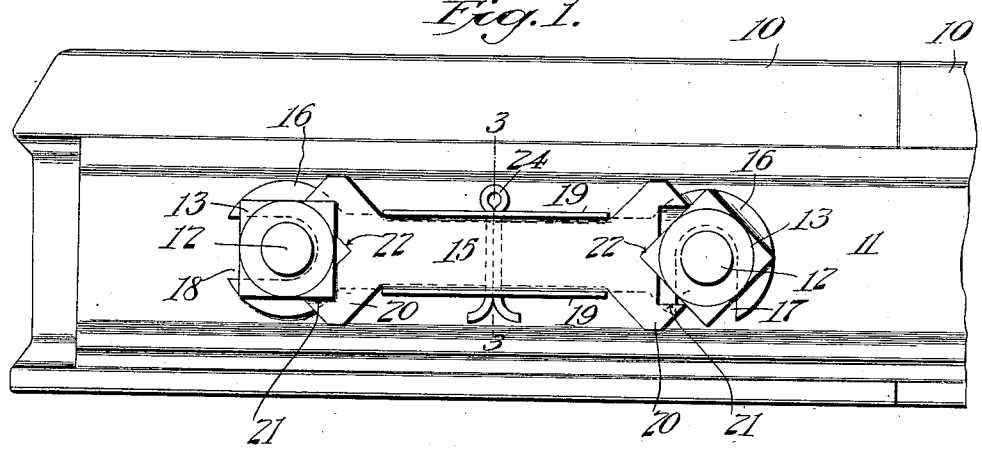
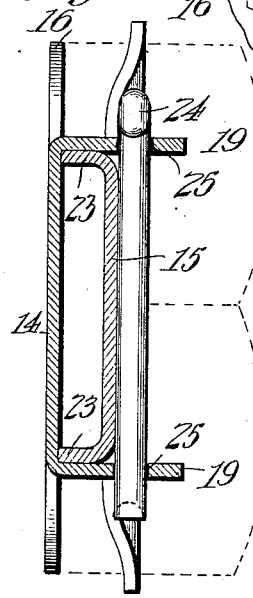
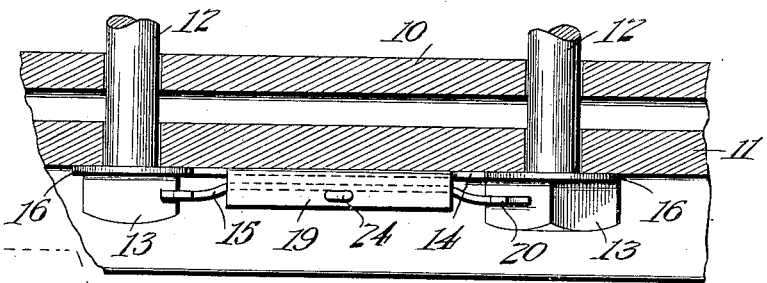
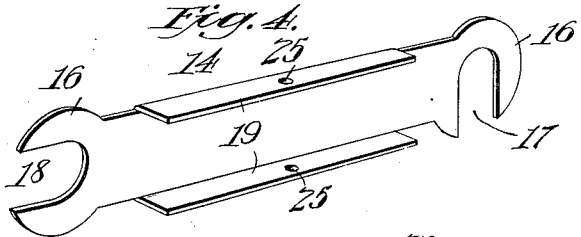
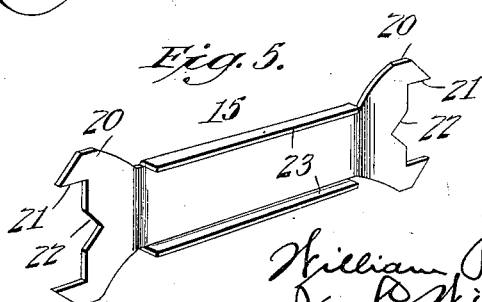
Witnesses
Inventors
William Rudd
J. C. Williams
By
Attorney

UNITED STATES PATENT OFFICE.

WILLIAM RUDD AND JOHN COLUMBUS WILLIAMS, OF OPELIKA, ALABAMA, ASSIGNORS OF ONE-FIFTH TO JOHN V. DENSON, OF OPELIKA, ALABAMA.

NUT-LOCK.

1,095,928.  Specification of Letters Patent.  Patented May 5, 1914.

Application filed December 30, 1912. Serial No. 739,260.

*To all whom it may concern:*

Be it known that we, WILLIAM RUDD and JOHN C. WILLIAMS, citizens of the United States, residing at Opelika, in the county of Lee and State of Alabama, have invented certain new and useful Improvements in Nut-Locks; and we do hereby declare the following to be a full, clear, and exact description of the invention, such as will enable others skilled in the art to which it appertains to make and use the same.

This invention relates to improvements in nut locks and it has for its primary object to provide a device of this character the construction of which is such as to adapt the same for use in securely holding against rotation nuts arranged in pairs. The invention, therefore, is of especial utility in connection with the fastening of bolts found at the meeting ends of railway rails, but is also applicable to various types of machines and mechanical constructions where it is desired to lock the nuts of bolts against accidental displacement.

A further object of the invention is to provide a nut lock of simplified construction to adapt the same for easy and inexpensive manufacture, and to so arrange and associate the parts thereof as to insure a positive holding of the nuts against rotation without the necessity of changing the nuts or bolts of standard construction to adapt them to such locking.

Having, therefore, these general objects in view, and others which will appear as the nature of the improvements is better understood, the invention consists substantially in the novel construction, combination and arrangement of parts hereinafter fully described, illustrated in the accompanying drawings, and pointed out in the appended claims.

In the drawings—Figure 1 is a side elevation of a nut lock constructed in accordance with the present invention, and illustrated as applied to the meeting ends of contiguous railway rails. Fig. 2 is a top plan view thereof, the rails being illustrated in section. Fig. 3 is a transverse sectional view on the line 3—3, Fig. 1. Fig. 4 is a detail perspective view of the holding member. Fig. 5 is a similar view of the locking member viewing the latter from its inner side.

Referring in detail to the accompanying drawings, the numeral 10 designates a pair of railway rails the contiguous ends of which abut, or substantially abut, as is usual in track construction, and these rails are provided with the fish-plates 11 commonly found at such points, the fish-plates and rails being joined by bolts 12 equipped with the usual nuts 13.

The hereindescribed nut lock includes a holding member 14, and a locking member 15, and both of these members are preferably formed of sheet metal, whereby the same may be readily stamped into the necessary configuration, thus permitting the invention to be easily manufactured at small cost, and without the employment of expensive and complicated machinery. At each end of the holding member 14 is an enlarged head 16, one of said heads being provided with a notch 17 which, when the holding member is in applied position on a fish-plate, extends in a vertical direction. The other head 16 has a similar notch 18, but this notch extends in a horizontal direction, and by reason of this arrangement of the notches 17 and 18, it will be noted that the holding member 14 is prevented from being displaced in either a direction vertically of the fish-plate, or longitudinally thereof.

At the upper and lower edges of the holding member 14 is provided a pair of parallel flanges 19, said flanges extending outwardly from the holding member 14 at the side thereof which is opposite to the side that contacts with the fish-plate. By reason of the formation of the flanges 19 a channelway is formed at the outer side of the holding member 14 which is designed to receive the locking member 15.

The locking member 15 is of less length than the holding member 14, the purpose of this being to permit the locking member to be positioned between the two bolts which are received by the notches 17 and 18. This locking member 15 is also provided with terminal heads 20, each of which heads is provided with a square notch 21 of such dimensions as will correspond with the dimensions of the nuts with which the lock is designed to be employed. The formation of the square notches 20 enables the locking member to be applied to the nuts when the same have been moved one-fourth of a rotation, as illustrated in Fig. 1, but to enable the application of the locking member to the nut in the event that the latter is turned only one-eighth of a rotation, the terminal heads 20 are each provided with an angular notch 22, which notches will receive the corners of the nuts, as also illustrated in Fig. 1.

That the locking member 15, when positioned upon the holding member, may be properly spaced therefrom, and thereby to permit the proper application of the locking member to the nuts for holding them against rotation, the locking member 15 is provided with a pair of parallel inwardly-extending marginal flanges 23, said flanges being embraced by the flanges 19 of the holding member, and resting against the outer face of the latter. In this position the locking member 15 is offset from the holding member 14 and the terminal heads 20 of the locking member 15 are projected away from the body of the holding member, so as to engage the nuts of the bolts at points substantially midway the front and rear faces of the nuts, and to further facilitate this positioning of said terminal heads the same are slightly bent outwardly away from the plane of the body of the member 15, as shown in Figs. 2 and 5. To the end that the locking member 15 may be held in associated relation with the holding member 14, a fastening pin 24 is employed. This pin is preferably in the form of a spring cotter, and is received by openings 25 which are formed in the flanges 19 of the holding member 14. With the pin 24 positioned in the openings, as clearly illustrated in Fig. 1, and its free or open end spread, it will be apparent that said pin is prevented being displaced from the flanges 19 by vibration, and thus securely holds the locking member 15 in associated relation with the holding member 14.

In the use of the herein-described nut lock, the holding member 14 is positioned upon the threaded ends of the bolts before the nuts of the latter are applied thereto, the notches 17 and 18 receiving the bolts. The nuts are now threaded upon the bolts and tightened to the desired extent, whereupon the locking member 15 is introduced between the flanges 19 of the holding member, the notches of the terminal heads 20 of the locking member receiving the nuts in accordance with the angular position of the nuts. This, therefore, prevents rotation of the nuts. With the locking member thus positioned, the fastening pin 24 is placed in the openings 25, thereby locking the member 15 within the flanges of the holding member, and in this position the locking member 15 is prevented separating from the holding member, and the nuts, until said fastening pin is removed.

As before stated, while the invention is primarily designed for use in connection with the fastening bolts of railway rails, the same is by no means limited to this use, but the invention is adapted for application to various forms of machines, locomotives, stationary engines, and all mechanical constructions where it is desired to prevent displacement of nuts from their bolts.

Having thus described the invention, what is claimed as new, and desired to be secured by Letters Patent, is:

1. A nut lock of the class described, comprising a holding member provided with notched terminal heads designed to receive a pair of contiguous bolts, a locking member associated with said holding member and having notched heads designed to embrace the nuts of the bolts to prevent rotation thereof, said locking member being provided with inwardly-extending marginal flanges adapted to contact with the holding member to offset the locking member from the holding member, whereby the heads of the locking member are positioned to engage the nuts of the bolts at points substantially midway the front and rear faces of the nuts, and a fastening element carried by the holding member and embracing the locking member to hold the latter upon the holding member and the nuts.

2. A nut lock of the class described, comprising a holding member provided with terminal heads each of which is notched, whereby to receive a pair of contiguous bolts, said holding member being further provided with a pair of parallel outwardly-extending flanges arranged intermediate said heads, a locking member associated with said holding member and having notched heads designed to embrace the nuts of the bolts to prevent rotation thereof, said locking member being received and positioned between the outwardly-extending flanges of the holding member and embraced thereby, the locking member being also provided with inwardly-extending marginal flanges which abut against the holding member to offset the locking member from the holding member, whereby the heads of the locking member are positioned to engage the nuts of the bolts at points substantially midway the front and rear faces of the nuts, and a fastening pin mounted in the flanges of the holding member and embracing the locking member to hold the latter upon the holding member and the nuts.

In testimony whereof we affix our signatures, in the presence of two witnesses.

WILLIAM RUDD.
JOHN COLUMBUS WILLIAMS.

Witnesses:
ANNIE K. BARNES,
JNO. V. DENSON.

---

Copies of this patent may be obtained for five cents each, by addressing the "Commissioner of Patents, Washington, D. C."